United States Patent
Bernays et al.

(10) Patent No.: US 8,540,023 B2
(45) Date of Patent: Sep. 24, 2013

(54) PRODUCED WATER DISPOSAL

(75) Inventors: Adam Bernays, Menton (FR); Antoine Le Cotty, Nice (FR); Vincent Alary, Roquebrune Cap Martin (FR)

(73) Assignee: Single Buoy Moorings, Inc., Marly (CH)

( * ) Notice: Subject to any disclaimer, the term of this patent is extended or adjusted under 35 U.S.C. 154(b) by 379 days.

(21) Appl. No.: 12/802,079

(22) Filed: May 28, 2010

(65) Prior Publication Data
US 2011/0011584 A1    Jan. 20, 2011

Related U.S. Application Data

(60) Provisional application No. 61/226,656, filed on Jul. 17, 2009.

(51) Int. Cl.
*E21B 43/00* (2006.01)
*E21B 15/04* (2006.01)

(52) U.S. Cl.
USPC .................. 166/267; 166/369; 210/170.05

(58) Field of Classification Search
USPC ............. 166/340, 341, 352; 175/206, 207; 210/241, 242.1, 747.5, 776; 114/264, 74 R
See application file for complete search history.

(56) References Cited

U.S. PATENT DOCUMENTS

| | | | | |
|---|---|---|---|---|
| 3,586,065 A * | 6/1971 | Bowles | | 141/1 |
| 4,085,695 A * | 4/1978 | Bylo | | 114/260 |
| 4,630,681 A * | 12/1986 | Iwamoto | | 166/366 |
| 6,200,473 B1 * | 3/2001 | Fahey | | 210/205 |
| 6,345,672 B1 * | 2/2002 | Dietzen | | 175/66 |
| 7,306,724 B2 * | 12/2007 | Gordon | | 210/241 |
| 7,628,224 B2 * | 12/2009 | D'Souza et al. | | 175/5 |
| 2004/0065614 A1 * | 4/2004 | Gordon et al. | | 210/650 |
| 2006/0180231 A1 * | 8/2006 | Harland et al. | | 141/1 |
| 2008/0179095 A1 * | 7/2008 | Eia | | 175/66 |
| 2010/0175884 A1 * | 7/2010 | Poldervaart et al. | | 166/352 |
| 2011/0147293 A1 * | 6/2011 | Imahashi | | 210/202 |
| 2012/0160566 A1 * | 6/2012 | Eia | | 175/66 |

FOREIGN PATENT DOCUMENTS

JP    2007084010 A *    4/2007

* cited by examiner

*Primary Examiner* — Matthew Buck
*Assistant Examiner* — James Sayre
(74) *Attorney, Agent, or Firm* — Leon D. Rosen

(57) ABSTRACT

Offshore hydrocarbon (e.g. oil) production units that produce considerable contaminated water (produced water), are able to repeatedly dispose of the produced water so each production unit requires only a moderate-sized tank to hold the produced water, and most of the tank storage capacity of the production unit can store hydrocarbons. A mobile water-treatment plant is provided on a converted tanker that sails from one production unit to another one, transferring produced water from the oil production units and separating out contaminants as by settling, to leave clean water that can be dumped into the sea and contaminants that cannot be dumped into the sea. The mobile plant occasionally sails to an onshore facility where it is allowed to dump contaminants.

2 Claims, 3 Drawing Sheets

PRODUCED WATER DISPOSAL

CROSS-REFERENCE

Applicant claims priority from U.S. Provisional Patent Application Ser. No. 61/226,656 filed Jul. 17, 2009.

BACKGROUND OF THE INVENTION

Offshore production units which produce hydrocarbons such as oil and natural gas, also produce a range of pollutants along with the hydrocarbons, including sand, stones, water, and contaminants that tend to remain suspended or dissolved in the water. Sand and stones generally can be dumped overboard because they sink to the seafloor, and some contaminants also can be dumped overboard along with water. However, many jurisdictions prohibit dumping into the sea, certain contaminants that may be harmful to sea life or to humans, or dumping water containing a high percent of the contaminants.

Contaminants in hydrocarbons that cannot be dumped overboard can be stored on the production unit in tanks specially used for this purpose. The production units also may include a water treatment plant to enable some of the contaminants to be separated out and dumped along with some of the water, to minimize produced water storage requirements. The production unit also includes storage tanks for storing produced hydrocarbons which the unit offloads to a tanker, or instead, the unit itself may sail away to a distant facility to offload the hydrocarbons before returning. To the extent that tanks on the production unit must be devoted to treating produced water and storing water that cannot be dumped, the production unit can store less hydrocarbons and offloading of hydrocarbons from the unit must occur more frequently which makes production more expensive.

A variety of production units are available, including FPSO (floating production and storage) units, TPL (tension leg platforms), SPAR units (long cylindrical structures) and fixed towers. The amount of water produced usually increases significantly over the life of the field. For example in a certain representative offshore field, the production of water was about 50,000 $m^3$ per day at the start up of hydrocarbon production, but expanded to 150,000 $m^3$ to 300,000 $m^3$ per day during a period of several years after startup. If each unit must be provided with sufficient production water storage capacity to store the maximum amount produced during the life of a field, then the oil storage capacity of the unit will be severely affected. A solution to the problem of disposing of variable large amounts of produced water without requiring very large water storage capacity in the production units, would be of value.

SUMMARY OF THE INVENTION

In accordance with one embodiment of the invention, a system and method are provided for disposing of produced water generated by hydrocarbon production units, so the production units can devote almost all of their fluid storage capacity to the storage of hydrocarbons. A mobile treatment plant in the form of a self-propelled tanker is provided that is devoted to the storage and treatment of produced water. The mobile treatment plant sails from one production unit to another one and receives produced water from each unit. While en route, the treatment plant processes the produced water, as by separating its components in a settling tank so clean water can be dumped into the sea. The treatment plant also visits an on-shore dump where produced water constituents that cannot be dumped into the sea can be offloaded to an on-shore dump. Alternately, the treatment plant can dump the produced water constituents into a dump located on another vessel.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
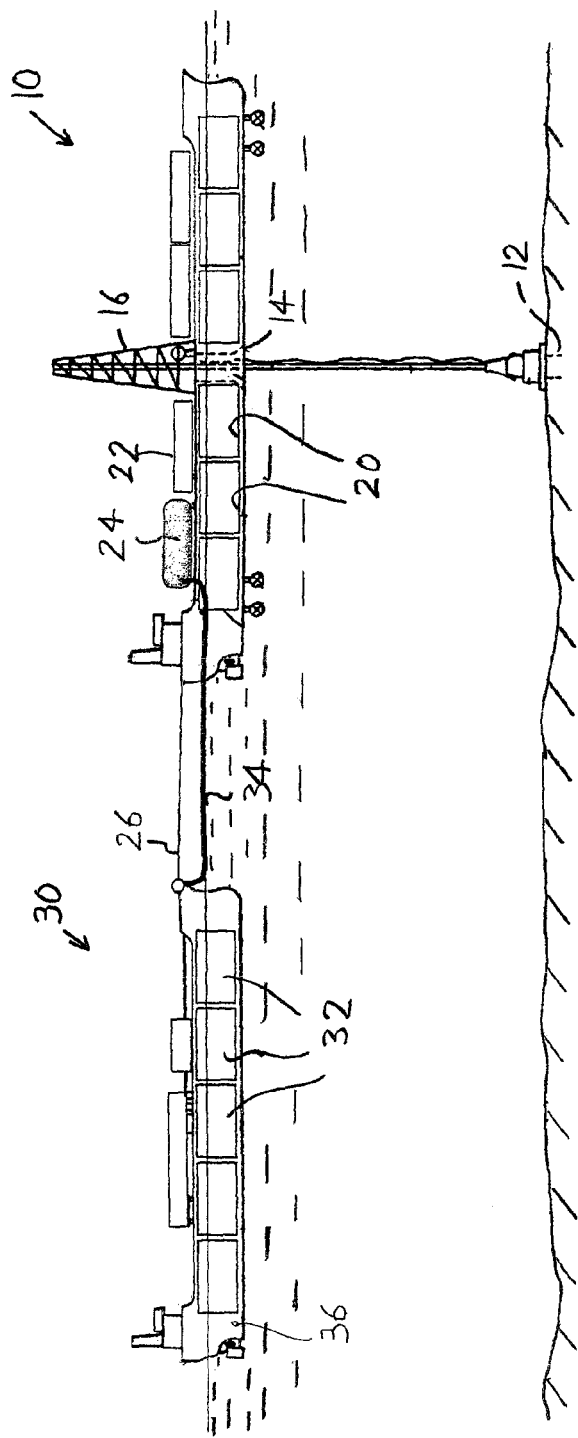
FIG. 1 is a side elevation view of a FPDSO (floating production, storage, drilling and offloading) unit and of a self-propelled mobile treatment plant that is in the process of offloading produced water from the FPSO unit.

FIG. 1 shows an offshore hydrocarbon production unit 10 in the process of offloading produced water that is produced by the unit along with hydrocarbons from an offshore well 12. The unit has a moonpool 14 and holds drilling equipment 16 for initial drilling and for workovers. The unit 10 has several tanks 20 that are used to hold hydrocarbons (oil, in this case) and has a treatment module 22 which treats the produced hydrocarbons (e.g. to separate out easily-separated contaminants such as sand and rocks and dump them overboard). A module on the deck also may be used to separate out gas (hydrocarbons that are gaseous above about 15° C.) that can be used as fuel or flared in small quantities. A storage tank 24 on the deck of the unit stores produced water, which is water that emanates from the well along with the hydrocarbons. The capacity of the water storage tank 24 is less than one-third the capacity of the oil storage tanks 20 on the production unit.

Figure 4:
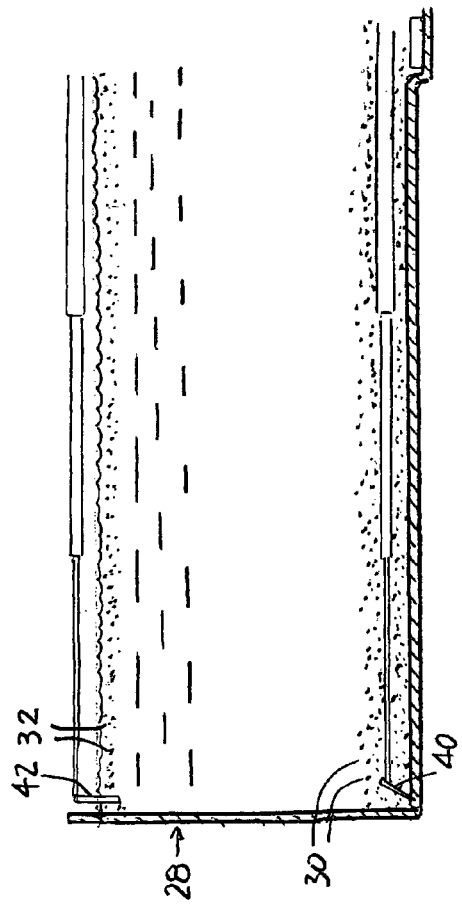
FIG. 4 is a partial sectional view of a produced water storage tank of the mobile treatment plant of FIG. 1, being used as a settling tank.

Applicant provides a mobile treatment plant 30 for handling large quantities of produced water so the production unit 10 does not have to. The treatment plant 30 has mobile plant storage tanks 32 for holding produced water that has been transferred along an export hose 34 from the production unit storage tank(s) 24 on the production unit 10 to the mobile treatment plant while the plant is moored by a line (cable, etc.) 26. The mobile treatment plant storage tanks are used primarily as settling tanks to separate water from contaminants that settle or float in the water. FIG. 4 shows a settling tank 28, showing that heavier-than-water constituents 30 sink while lighter-than-water constituents 32 float, and that both constituents can be removed by skimmers 40, 42.

The mobile treatment plant is preferably a converted tanker. In one example, the settling tanks 32 have a combined storage capacity of 124,000 m3 and can separate out the constituents of produced water at a rate of 158,000 m3 with a completeness sufficiently to discharge clean water to the sea. FIG. 4 shows one of several types of settling tanks. The settling of constituents from water can be enhanced by tank heating, hydro-cyclones (spinning for centrifugal force), gas floatation (bubbling air or other gas through the tank to float constituents to the top), filtering, and chemical injection. The mobile treatment plant is also provided with an oily water discharge and monitoring system to maximize clean water discharge rates. Clean water is discharged through an outlet 36. The different processes can be used to treat oil from different production units containing different contaminants, as by settling in different tanks. The processes also can be used to speed up the separation of constituents at an increased cost of fuel, if too much produced water must be handled.

Local regulations specify the amount of certain contaminants can be present in water that is discharged into the sea. The mobile treatment plant 30 has laboratories for measuring the amounts of contaminants to be sure that excess amounts are not present in discharged water. Some jurisdictions limit the amount of contaminants that can be dumped within an area such as a square kilometer, per day. The fact that the mobile treatment plant is often moving, enables it to more easily comply with these regulations.

Figure 2:
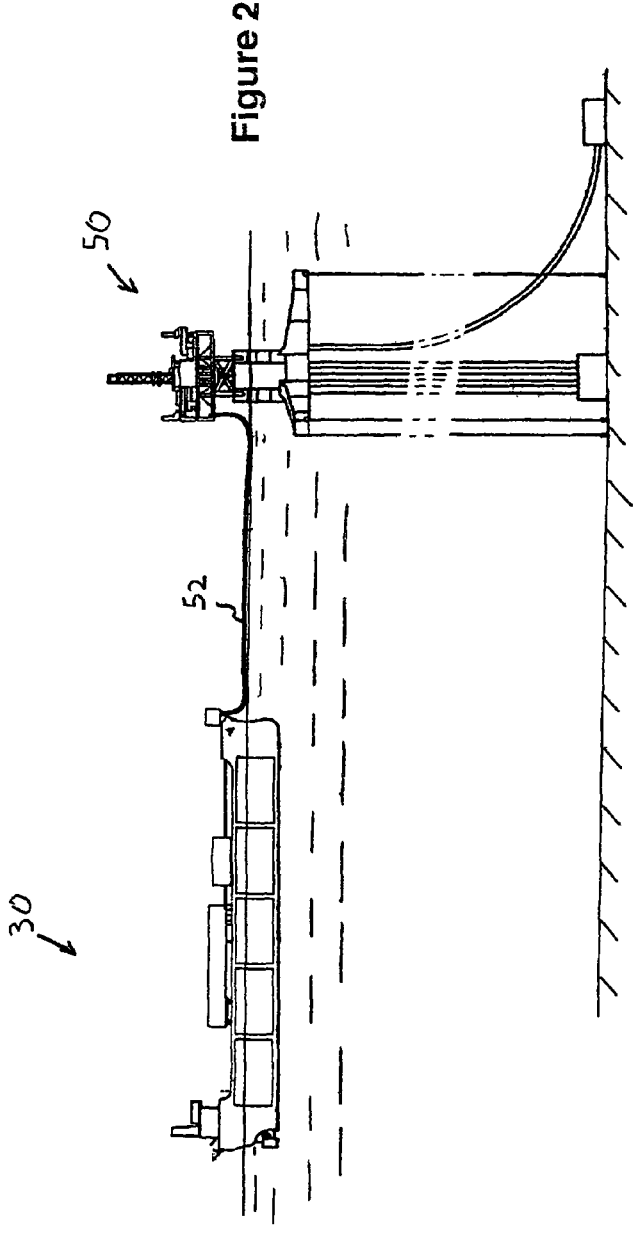
FIG. 2 is a side elevation view of a TLP (tension leg platform) unit and of the mobile treatment plant of FIG. 1 in the process of offloading produced water.

As mentioned above, a variety of different production units may be used. FIG. 2 shows a production unit 50 that is a TLP (tension leg platform), in the process of transferring produced water through a hose 52 to the mobile treatment plant 30. The contaminants remaining after separation may not be legal to dump into the sea if present in more than a certain percent. Examples are heavy metals and carcinogens. Such contaminants may be disposed of by burning in a very hot fire, or by dumping into an authorized dump that can be located on shore or on another vessel.

Figure 3:
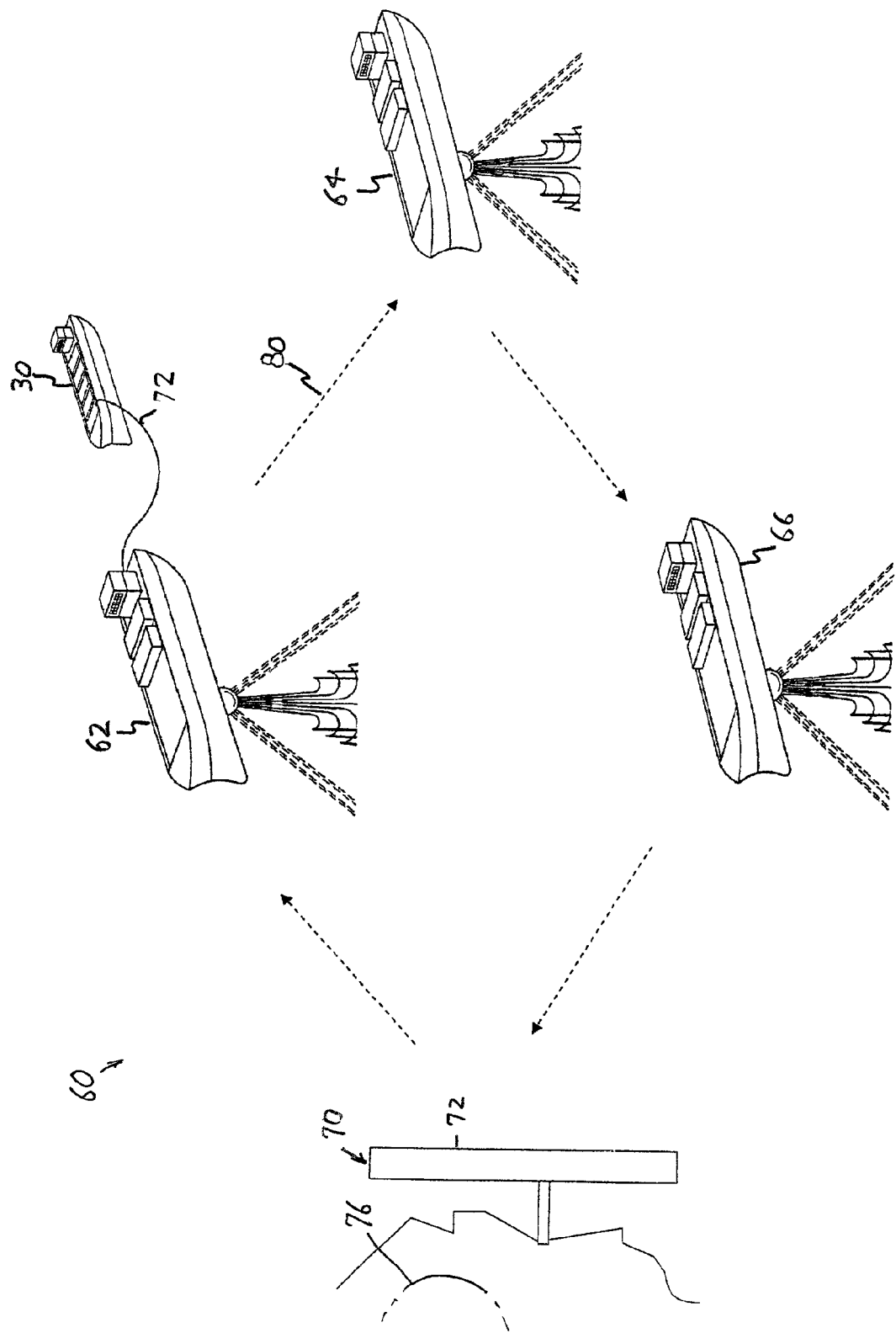
FIG. 3 is an isometric view of a system that includes a plurality of hydrocarbon production units, a self-propelled mobile treatment plant, and an on-shore dump.

FIG. 3 shows a system 60 that includes a plurality of production units 62, 64, 66 and an on-shore dump 70. By "on-shore" applicant is referring to a facility that is on the shore or that is close to shore (within one kilometer) and coupled to the shore by a road or conduits that allow material to be easily moved onto the shore. Dumps are commonly used to receive unwanted materials that cannot otherwise be disposed of, such as from mines. The particular dump 70 includes a quay 72 and a road 74 over which dump trucks can move to a final dump site 76 located inward from the shore, where material is dumped into or onto the ground. The mobile treatment plant 30 is shown connected by a hose 72 to one production unit 62 to receive dumped water from it. The plant 30 sails along a circuit 80 to each of the production units and then may sail to the dump 70. The treatment of produced water on the mobile plant is continuous during sailing. The circuit 80 is relatively small in maritime terms, with a distance between production units of no more than 300 kilometers, which equates to several hours of sailing time. The units are at least 0.1 kilometer apart.

Recovered oil and sludge will be burned or discharged to the on-shore facility on a regular basis. The mobile plant can make periodical calls at a shore facility to empty tanks of recovered oil and sludge, conduct crew changes, etc.

Thus, the invention provides a method for operating a system of hydrocarbon production units that produce considerable water along with the hydrocarbons, which frees the oil storage tanks on the production units to hold more oil. This is accomplished by providing a self propelled mobile plant, preferably a converted tanker, that sails in a circuit between production units and offloads produced water from the production units. The mobile plant treats the produced water to remove contaminants so much of the water can be dumped into the sea, and accomplishes the treatment while the mobile plant sails between units and to an authorized dump. It may be noted that some production units produce large quantities, or primarily, natural gas. In that case, the production unit may cool the gas until it is liquidated.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A method for using a plurality of production units to produce hydrocarbons from a sea floor, for efficiently storing the hydrocarbons, and for disposing of produced water that is produced with the hydrocarbons, comprising:

storing produced hydrocarbons on at least one tank of each of said production units;

storing produced water in at least one water tank (24) of each of said production units;

sailing a mobile plant (30) to each of a plurality of said production units, transferring produced water from a water tank (24) of the production unit to said mobile plant, sailing away said mobile plant (30) from the production unit while said mobile plant treats said transferred produced water to separate acceptable clean water from contaminants until the clean water can be dumped into the sea and dumping the clean water from the mobile plant into the sea, and disposing of the contaminants;

said step of disposing of contaminants comprises allowing contaminants to settle out of water while the water is in at least one tank on said mobile plant, and while the mobile plant is sailing between said production units, and dumping water into the sea from which said contaminants have been removed.

2. A method for producing hydrocarbons from a plurality of spaced hydrocarbon production units that each produces fluids from a different sea floor well, and for efficiently storing the hydrocarbons and disposing of contaminated produced water that accompanies the produced hydrocarbons, comprising:

sailing a mobile plant to each of said production units in sequence, and at each production unit transferring produced water from the production unit to the mobile plant;

while sailing said mobile plant between said production units, separating acceptable clean water from contaminants in the production water, dumping the clean water into the sea, and storing the contaminants for later dumping.

* * * * *